(12) United States Patent
Battlogg et al.

(10) Patent No.: US 8,251,402 B2
(45) Date of Patent: *Aug. 28, 2012

(54) ENERGY ABSORBING DEVICE

(75) Inventors: Stefan Battlogg, St. Anton I.M. (AT);
Gernot Elsensohn, St. Anton I.M. (AT);
Helmut Kirmsze, Schaan (LI); Jürgen Pösel, Bludenz (AT)

(73) Assignee: Thyssenkrupp Presta AG, Eschen (LI)

( * ) Notice: Subject to any disclaimer, the term of this patent is extended or adjusted under 35 U.S.C. 154(b) by 463 days.

This patent is subject to a terminal disclaimer.

(21) Appl. No.: 12/545,888

(22) Filed: Aug. 24, 2009

(65) Prior Publication Data

US 2010/0045011 A1 Feb. 25, 2010

(30) Foreign Application Priority Data

Aug. 22, 2008 (EP) ..................................... 08014895

(51) Int. Cl.
*B62D 1/18* (2006.01)

(52) U.S. Cl. .......................... 280/777; 180/274; 188/268

(58) Field of Classification Search ................... 280/775, 280/777; 77/492; 188/267, 267.2, 268, 269; 180/271, 274

See application file for complete search history.

(56) References Cited

U.S. PATENT DOCUMENTS

| 2,820,471 | A | * | 1/1958 | Crowell | 137/251.1 |
| 3,405,728 | A | * | 10/1968 | Dexter | 137/251.1 |
| 3,552,275 | A | * | 1/1971 | Chaney et al. | 91/418 |
| 4,019,403 | A | * | 4/1977 | Kondo et al. | 74/492 |
| 5,445,249 | A | * | 8/1995 | Aida et al. | 188/378 |
| 5,632,361 | A | * | 5/1997 | Wulff et al. | 188/267 |
| 6,095,486 | A | * | 8/2000 | Ivers et al. | 251/129.01 |
| 6,279,952 | B1 | * | 8/2001 | Van Wynsberghe et al. | 280/777 |
| 6,471,018 | B1 | * | 10/2002 | Gordaninejad et al. | 188/267.1 |
| 6,514,001 | B1 | * | 2/2003 | Yezersky et al. | 403/109.1 |
| 7,165,786 | B1 | * | 1/2007 | Sha et al. | 280/775 |
| 7,922,202 | B2 | * | 4/2011 | Battlogg et al. | 280/777 |
| 2002/0047295 | A1 | * | 4/2002 | Sullivan et al. | 297/216.1 |
| 2008/0245627 | A1 | * | 10/2008 | Battlogg et al. | 188/267.2 |
| 2008/0245628 | A1 | | 10/2008 | Battlogg et al. | |
| 2011/0140392 | A1 | * | 6/2011 | Battlogg et al. | 280/284 |
| 2011/0148071 | A1 | * | 6/2011 | Battlogg et al. | 280/286 |

FOREIGN PATENT DOCUMENTS

| DE | 19820570 A1 | 11/1999 |
| WO | 2007068016 A1 | 6/2007 |
| WO | 2007068435 A1 | 6/2007 |
| WO | 2007068436 A1 | 6/2007 |

OTHER PUBLICATIONS

European Search Report dated Feb. 17, 2009.

* cited by examiner

*Primary Examiner* — Paul N Dickson
*Assistant Examiner* — Timothy Wilhelm
(74) *Attorney, Agent, or Firm* — Laurence A. Greenberg; Werner H. Stemer; Ralph E. Locher

(57) ABSTRACT

An energy-absorbing apparatus for occupant protection in vehicles, has a receptacle with a magneto-rheological fluid which in the event of an impact is pressed through a flow zone determining the flow velocity. A device generating a variable magnetic field has pole faces in the flow zone, the magnetic field acting on the magneto-rheological fluid between the pole faces in order to regulate the flow velocity. The flow zone is divided into at least two flow routes by at least one partition forming two additional planar pole faces.

51 Claims, 8 Drawing Sheets

ENERGY ABSORBING DEVICE

CROSS-REFERENCE TO RELATED APPLICATION

This application claims the priority, under 35 U.S.C. §119, of European application EP 08014895.0, filed Aug. 22, 2008; the prior application is herewith incorporated by reference in its entirety.

BACKGROUND OF THE INVENTION

Field of the Invention

The invention relates to an energy-absorbing apparatus for occupant protection in vehicles. A receptacle contains a magneto-rheological fluid which is pressed through a flow zone in the event of an impact. A device which generates a variable magnetic field and which has pole faces that are assigned to the flow zone and via which the magnetic field acts on the magneto-rheological fluid in order to regulate the flow properties.

So that the flowability of the magneto-rheological fluid can be influenced by means of a magnetic field such that the flow resistance of the flow zone changes, various criteria have to be fulfilled. A magnetic field generated by a coil has to be introduced into the magneto-rheological fluid, for which purpose elements and parts of the apparatus which are provided for the direct path of the flux lines through the magneto-rheological fluid should have better magnetic conductivity than other elements and parts which are outside the direct path of the flux lines.

An apparatus of that type is described, for example, in our earlier U.S. patent application publication US 2008/0245628 A1 and its counterpart international PCT publication WO 2007/068436. There, the magnetic field is generated by a coil which is provided with a C-shaped core consisting of a magnetically active material, in particular an iron core. Between the two slightly spaced-apart pole faces of the C-shaped core, an outlet duct of rectangular cross section is led through out of the receptacle and contains the flow zone. The walls of the outlet duct which bear against the pole faces consist of magnetically highly conductive material, whereas the side walls consist of a material having an at least lower magnetic conductivity than the magneto-rheological fluid.

The special circumstances occurring in the event of an impact leave only an extremely short time span within which the flowability of the magneto-rheological fluid must be varied. In order to change the flowability, a minimum dwell time in a magnetic field is required, and therefore the cross section of the outlet duct and its magnetizing length, that is to say the length of the pole faces, predetermine that volume of the magneto-rheological fluid which can be magnetized in a minimum dwell time. So that the volume flow resulting from the pressure area acting on the fluid in the receptacle and from the velocity of travel of the pressure area upon impact is equated to the volume flow determined by the minimum dwell time, specific dimensions of the outlet duct are required. Since the outlet duct height determined by the spacing between the pole faces should only be increased to a limited extent, mostly only the width of the outlet duct and the length within which the magnetic field acts can therefore be changed, insofar as construction space problems do not also limit these.

According to the above-mentioned publications (US 2008/0245628 A1 and WO 2007/068436), an attempt is made to increase the dwell time of the fluid between the pole faces by means of fittings introduced into the flow zone, when the length of the flow zone within which the magnetic field acts is too short, for example by means of a separating plate having a plurality of webs which are upstanding on both sides and are arranged in offset rows. The passage of fluid is thereby extended, but the cross-sectional area of the outlet duct and therefore the volume magnetizable per unit time are reduced by the webs.

SUMMARY OF THE INVENTION

It is accordingly an object of the invention to provide an energy-absorbing device, which overcomes the above-mentioned disadvantages of the heretofore-known devices and methods of this general type and which allows, even under extremely restricted conditions of space, to introduce magnetic forces causing the change in viscosity of the magneto-rheological fluid.

The stated object is achieved in that the flow zone is subdivided into at least two flow routes by at least one partition forming two additional pole faces.

With the foregoing and other objects in view there is provided, in accordance with the invention, an energy-absorbing apparatus for occupant protection in vehicles, comprising:

a receptacle containing a magneto-rheological fluid;

a flow zone disposed to have the magneto-rheological fluid pressed therethrough in the event of an impact;

a device configured to generate a variable magnetic field, the device including pole faces assigned to the flow zone and configured to cause the magnetic field to act on the magneto-rheological fluid in order to regulate flow properties thereof; and at least one partition dividing the flow zone into at least two flow routes, the at least one partition forming two additional pole faces.

Each partition, although reducing the cross-sectional area of the flow zone and consequently the fluid volume magnetizable per unit time, nevertheless brings about substantially better magnetization due to the smaller spacings between two pole faces in each case. This makes it possible to increase the overall height of the flow zone such that its throughflow cross section, in spite of the partition, can be kept correspondingly large to the magnetizable volume of the magneto-rheological fluid being pressed through.

In a preferred version, there is provision for the entrance to the flow zone to comprise a contraction, the flow zone preferably being provided in an outlet duct of the receptacle, the outlet duct following the contraction. Additional pole faces introduced increase here the concentration of the magnetic field onto the particles in the magneto-rheological fluid which come into interaction with the magnetic field. In this case, to improve the action, turbulences in the flow should as far as possible be avoided, at least not promoted. The installation of partitions which have a smooth surface not promoting any turbulences is therefore to be preferred. In particular, planar faces are suitable. Upstanding webs or edges are a disadvantage. In contrast to this, friction-increasing layers are perfectly conceivable and possible.

Preferably, a plurality of partitions are combined into a bundle and are inserted into the flow zone. In this bundle, the spacings, critical for the intensity of magnetization, between the pole faces are very small.

In a first version, the bundle may be constructed from partitions which extend parallel to the flow routes and which are spaced apart by upstanding spacer pieces or tabs, in particular bent-up edge tabs. The bundle can be held together via any desired connection to the tabs, direct adhesive bonding, soldering, adhesive strips or the like. For example, 16 partitions of a thickness of 0.2 mm may be provided which subdivide the outlet duct into 17 flow routes of 0.2 mm. The outlet duct therefore has a clear height of 6.6 mm in the region of the pole faces. In another version of the invention, the bundle of partitions may also be produced by means of a zigzag-like folding of a material sheet.

At least some of the partitions, but preferably all the partitions, are of planar design, without projections, and are oriented perpendicularly to the flux lines of the magnetic field which are bunched between the pole faces.

In a further version, the at least one partition may extend in a cross-sectional plane of the flow zone and have slots which form the flow routes, the slot walls constituting the additional pole faces. A partition of this type may be produced as a sheet metal stamping, as a sintered part or as an MIM part (by metal injection molding), said partition having, for example, a ladder-like or a comb-like appearance. Preferably, the remaining webs between the slots may extend on both sides of a middle connecting web.

In order to achieve any necessary length of the flow routes, in this version a plurality of partitions of this type may be lined up closely to one another, the slots being in alignment.

A version in which the partitions are stamped out of transformer sheet and are insulated, in particular lacquered, at least on the faces touching one another can be produced particularly advantageously and easily. The insulation prevents the situation where eddy currents which occur may be added together.

The invention also makes it possible in a simple way to provide the outlet duct with a cylindrical cross section. In this preferred embodiment, the device comprises a continuous cylindrical tube in which the contraction is formed due to the installation of the partition, but of course, in particular, due to the installation of an above-described bundle of partitions, the bundle being assigned on each of the two sides, as a closure, an element having a cross section in the form of a segment of a circle and consisting of a material of high magnetic conductivity, such an element as is used in practice for coil cores and is designated below as coil core material, for example consisting of a transformer sheet or a ferrite powder, so that the cylindrical tube is filled. The cylindrical tube in this case consists, in particular, of a material having no magnetic conductivity or at least having lower magnetic conductivity than the magneto-rheological fluid to be pressed through the flow routes, in order to avoid a magnetic short circuit via the tube wall. Even the bundle itself may be constructed according to this requirement in terms of magnetic conductivity, in that, for example, partitions extending parallel to the flow routes and consisting of coil core material are spaced apart from one another by webs consisting of material having at least lower magnetic conductivity.

If the partitions are stamped out of the coil core material, as described above, the remaining webs cannot consist of a material of lower magnetic conductivity; it has been shown, however, that, with appropriate minimization, the webs are saturated magnetically such that the magnetic field is still forced sufficiently through the flow routes. Alternatively, clearances in the partitions may advantageously be provided, through which are led holding devices consisting of material of low magnetic conductivity or of magnetically non-conductive material which keep the partitions spaced apart from one another.

In a further preferred version, there may be provision for the bundle to have a cavity which is continuous over the length and which extends centrally in the outlet duct. This version makes it possible to lead a component through the contraction and the inserted bundle. This component may, for example, be a cable or a piston rod or the like if a piston pressing the magneto-rheological fluid out of the receptacle in the event of an impact is not pushed, but, instead, is pulled. A pull device of this type is described in our earlier patent publication US 2008/0245628 A1 and its counterpart international PCT application WO 2007/068435. This version of the invention makes it possible to have a particularly simple and compact design, along with very low losses in the action of the magnetic field introduced.

In a further preferred version which constitutes a highly space-saving design, the coil generating the magnetic field may be provided inside the outlet duct (internal coil), preferably the partitions being combined in two bundles which are arranged on both sides of the core wound with the coil. The core arranged between the two bundles of partitions is preferably designed as an approximately parallelepipedal block, around which is laid the coil winding, the axis of which lies perpendicularly to the direction of flow through the outlet duct. The core within the coil may likewise contain flow routes if the winding of the coil leaves free the inlet and outlet orifices of the flow routes. A coil of this type is, in particular, wound three-dimensionally, an approximately semicircular portion being formed in each case between two straight portions extending in the longitudinal direction.

In a further preferred version, two three-dimensional internal coils of this type may be provided, in each of which an element in the form of a segment of a circle is arranged as a core, a bundle of partitions being provided between the two elements in the form of a segment of a circle. As already mentioned above, a continuous cavity may advantageously be formed inside the bundle lying between the two coils.

This version is also advantageous particularly when the receptacle and the outlet duct are manufactured in one piece from a continuous tube. If the tube is cylindrical, as is advantageous, particularly at higher pressures, for the absorption of stresses, along with low deformation, the two bundles are again completed by an element having a cross section in the form of a segment of a circle, which consists of coil core material and the curved faces of which bear against the tube inside. In contrast to the version described above, with an externally arranged coil, in this version the tube preferably consists of coil core material or of a low-alloyed steel, in order to close the magnetic circuit directly without additional elements.

If the partitions are provided perpendicularly to the flow zone and are stamped out of transformer sheet or another coil core material, then there is preferably provision, further, whereby, in each partition, at least the webs separating the slots and preferably also a middle region belonging to the core, and also the elements in the form of a segment of a circle, are produced in one piece and coherently via at least one connecting web.

Such energy absorption apparatuses according to the invention my be used, for example, in steering columns for absorbing the impact energy which is transmitted to the steering wheel by the driver in the event of an accident. Functionality must be ensured here through a long service life. So that the magneto-rheological fluid is exposed as little as possible to variation over the service life, in a preferred version the magneto-rheological fluid is sealingly enclosed in a capsule. The capsule preferably has in its wall a predetermined bursting region which, when a predefined internal pressure is overshot, bursts open and causes the magneto-rheological fluid to emerge from the capsule. In this case, it is conceivable and possible to enclose only the magneto-rheological fluid in the capsule and to insert the capsule into the receptacle such that the bursting region comes to lie at the contraction followed by the outlet duct.

In an alternative embodiment, the entire apparatus or at least the receptacle, filled with the magneto-rheological fluid, and the flow zone are surrounded by the capsule. The bursting region is in this case arranged on the side, facing away from the receptacle, of the flow zone which is already filled with fluid from the outset. When the bursting region opens, the fluid emerges from the orifice obtained and flows out through the outlet duct. In this way, the "idle stroke time" until the counterforce is generated by the flow through the flow zone can be shortened. To intercept the fluid, an additional interception capsule may be provided which surrounds the first capsule. Further, the magnetic field or the field-generating component may, if required, be used for heating the fluid.

In a further version of the apparatus according to the invention, the entire device for generating the variable magnetic field (coil, partition bundles, core, etc.) can also be moved axially in a cylindrical tube, for example in order to set the length of the steering column to different drivers. Advantageously, in this case, the device may be pulled or pushed by means of a piston rod, through the bore of which the power supply cords can be led, or the device may be moved by means of a cable.

Other features which are considered as characteristic for the invention are set forth in the appended claims.

Although the invention is illustrated and described herein as embodied in an energy absorbing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
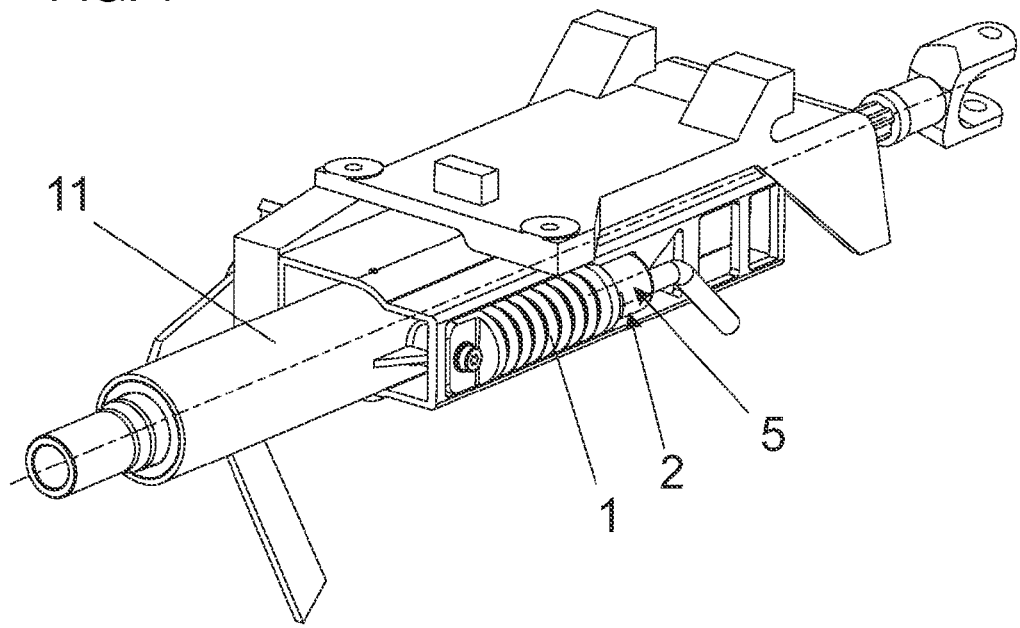
FIG. 1 shows a diagrammatic detail of a steering column with an apparatus according to the invention.
Figure 8:
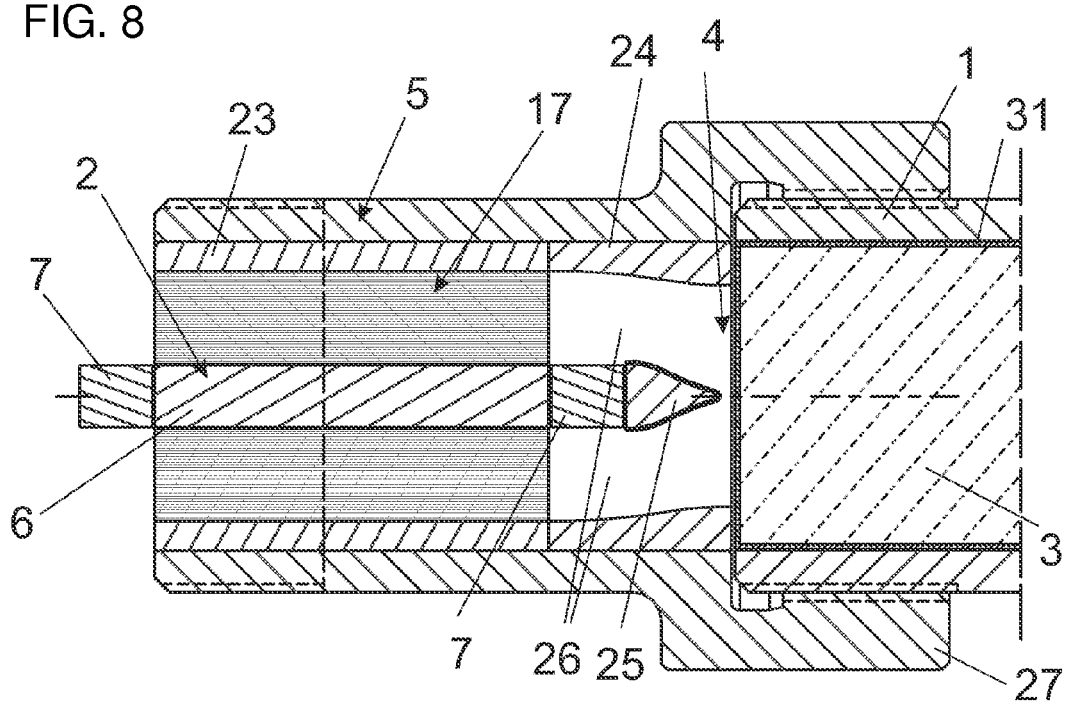
FIG. 8 shows a longitudinal section through the third version of the apparatus.

Referring now to the figures of the drawing in detail and first, particularly, to FIG. 1 thereof, the apparatus according to the invention may be implemented as an energy-absorbing apparatus and may be provided, for example, on a steering column 11, parallel to the parts of the latter which are displaceable longitudinally in the event of a collision. The apparatus has a receptacle 1, the volume of which can be reduced and which contains a magneto-rheological fluid 3 (FIG. 8). The receptacle 1 is fixed at one end of a displaceable part of the steering column 11, while the other end, followed by an outlet duct, stands on or is fixed to a non-displaceable part of the steering column 11. In the event of an impact, the steering column 11 can be shorted, and the magneto-rheological fluid contained in the receptacle 1 is pressed into the outlet duct through a flow zone 5 in which the explosion of the magneto-rheological fluid is delayed. Impact energy is absorbed by the counterforce thus generated.

A device 2 for generating a variable magnetic field is provided in the region of the contraction for the transmission between the receptacle 1 and the flow zone 5 in the outlet duct. The device 2 comprises an electromagnet, via which a magnetic field is generated and influences the flow properties of the magneto-rheological fluid. The electromagnet can be activated via signals from sensors, which monitor an impact, as a function of various criteria, such as the weight and sitting position of the driver, etc., the variable magnetic field varying the viscosity of the magneto-rheological fluid 3 to be pressed through the orifice, and the counterforce in the system becoming higher or lower, starting from the contraction 4. The receptacle 1 in FIG. 1 has, for example, a compressible concertina.

Figure 2:
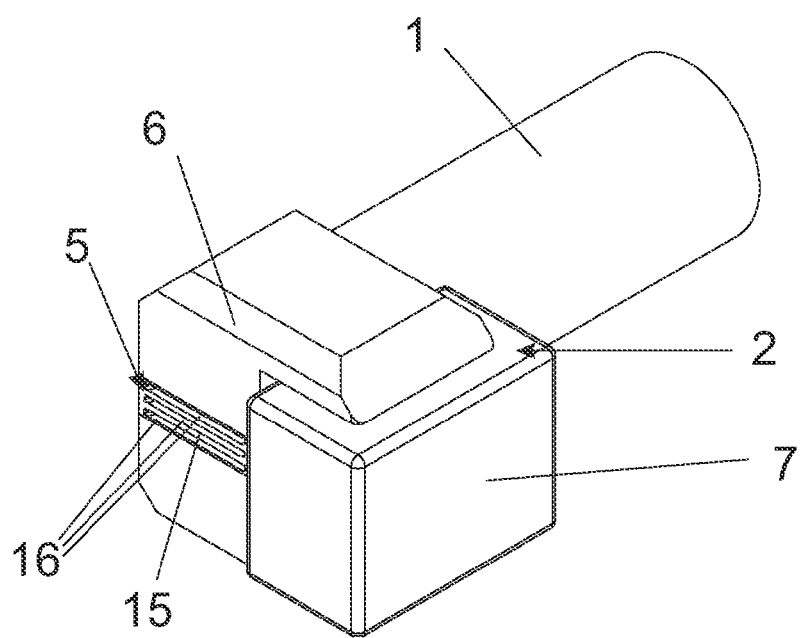
FIG. 2 shows a diagrammatic oblique view of a first version of the apparatus according to the invention.
Figure 3:
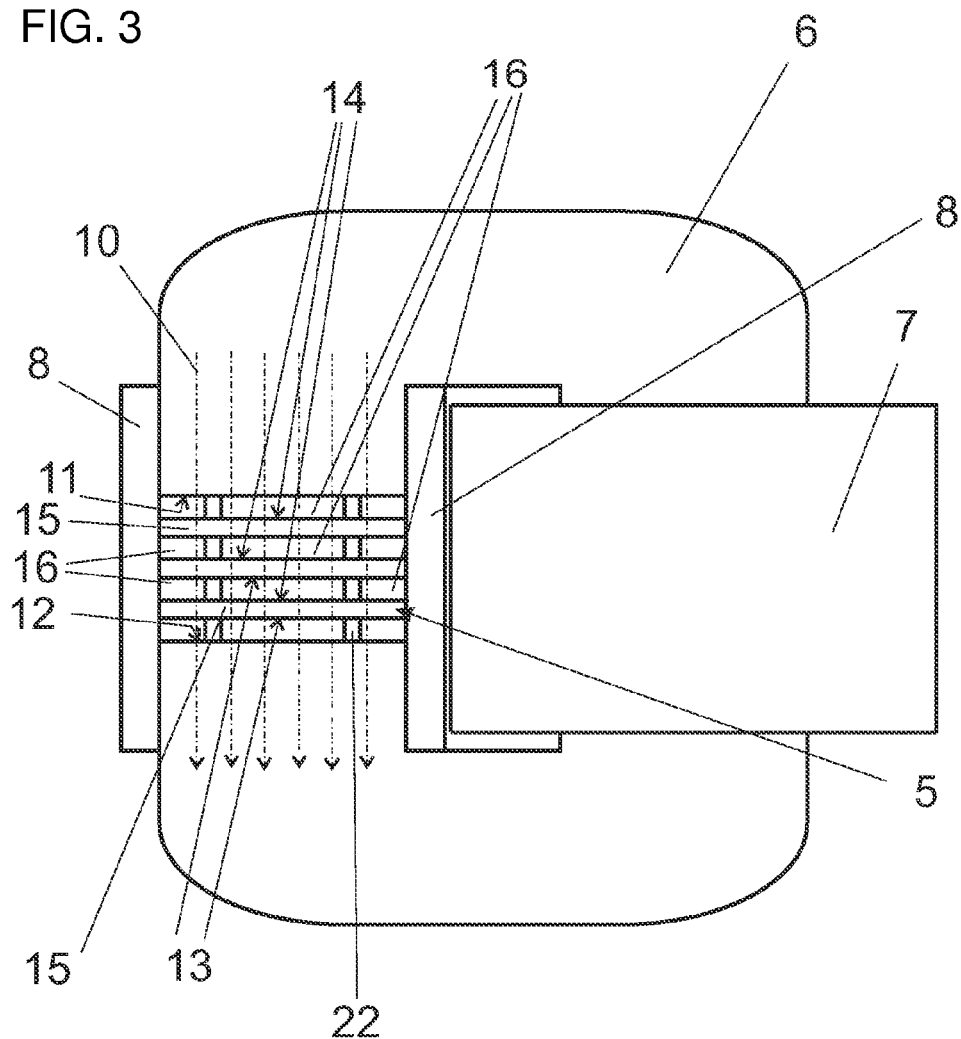
FIG. 3 shows an end view of a first version of the apparatus according to FIG. 2 with the run of the flux lines of a magnetic field.

Details of a first version can be seen more clearly in FIGS. 2 and 3. The receptacle 1 is, in particular, cylindrical and contains a displaceable piston, by means of which the magneto-rheological fluid 3 is expelled in the event of an impact. The following outlet duct is approximately rectangular in cross section, and the flow zone 4 is subdivided by partitions 15, which consist of a highly conductive coil core material and two of which are shown in FIG. 2, into flow routes 16 which are of substantially reduced height along with an identical width. The device 2 of this version has a coil 7 which is provided with a C-shaped core 6 consisting of a magnetically highly conductive coil core material, for example of iron, and the axis of which lies perpendicularly to the direction of flow of the magneto-rheological fluid 3 in the flow zone 5 or to the flow routes 16 formed by the partitions 15. The C-shaped core 6 may also be composed of sheets, in particular transformer sheets.

In addition to iron as the most beneficial material with good "magnetic" properties, the following also come under consideration as coil core materials:

silicon iron, a relatively beneficial material with good magnetic properties, with low electrical conductivity and with the lowest possible retentivity, magnetic steel, a material of somewhat higher price, non-corrosive and with somewhat poorer magnetic properties, nickel iron, a classic soft-magnetic alloy of higher price and with highest permeability, and iron cobalt as the most costly material, but with the highest saturation flux density.

Depending on the place of use, other materials are possible (for example, a core consisting of ferrite, iron powder, or other powder mixtures). Where appropriate, more "exotic" materials afford advantages (for example, BASF Catamold FN50: injection molding-compatible).

The C-shaped core 6 has planar pole faces 11, 12 which are parallel to one another and between which the outlet duct is led through. The magnetic conductivity of the magneto-rheological fluid 3 is lower than that of the core 6, so that the intensity of the magnetic field shown by the flux lines 10 in FIG. 3 is dependent on the height of the gap between the pole faces 11, 12. Each partition 15 reduces the height and forms additional planar pole faces 13, 14. If only one partition 15 is provided, the upper flow route 16 is assigned to the pole faces 11 and 14 and the lower flow route 16 is assigned to the pole faces 13 and 12. Each further flow route 16 lying between them can be influenced by pole faces 13 and 14 of two partitions 15. In the version according to FIG. 2, the flow zone 5 in that portion of the outlet duct which passes through the core 6 is provided with three flow routes 16 which occupy virtually the entire width. In the version according to FIG. 3, the side walls 8 of the outlet duct, at least within the flow zone 5, consist of a material having at least low magnetic conductivity, and the partitions 15 consisting of coil core material are spaced apart from one another by webs 22 which likewise consist of a material having at least low magnetic conductivity.

Figure 4:
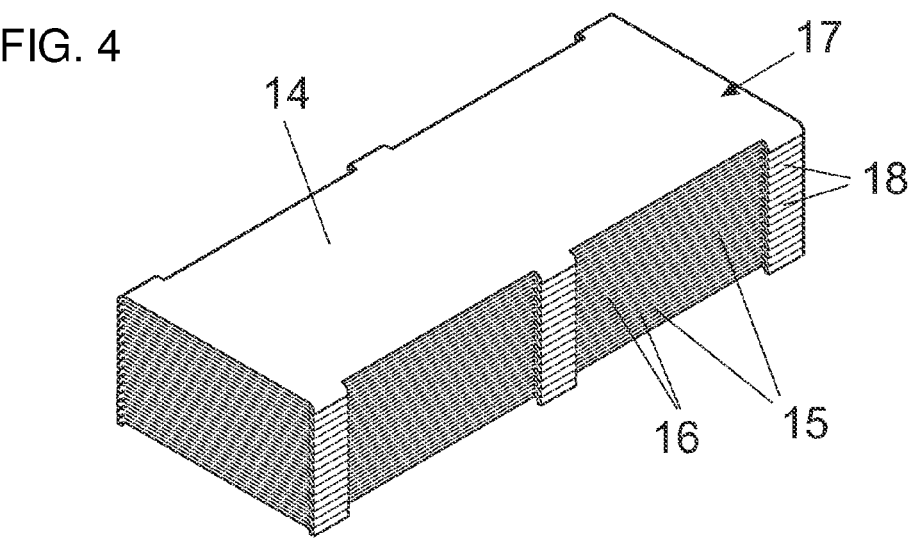
FIG. 4 shows an oblique view of a bundle of partitions of a first version.

FIG. 4 shows partitions 15 which have tabs 18 which are bent away along the two longitudinal side margins and by means of which the partitions 15 are spaced apart and which delimit a multiplicity of flow routes 16. The partitions 15 are connected via the tabs 18 by adhesive bonding, soldering or the like to form a bundle 17 which can be pushed as a unit into the outlet duct. The partitions 15 consist, for example, of a transformer sheet, that is to say of a material having very high magnetic conductivity, and the bundle 17 shown in FIG. 4 comprises in each case sixteen partitions 15 and flow routes 16 which all have the same thickness or height of, for example, 0.2 mm. The bundle 17 therefore has an overall thickness of 6.4 mm.

Figure 5:
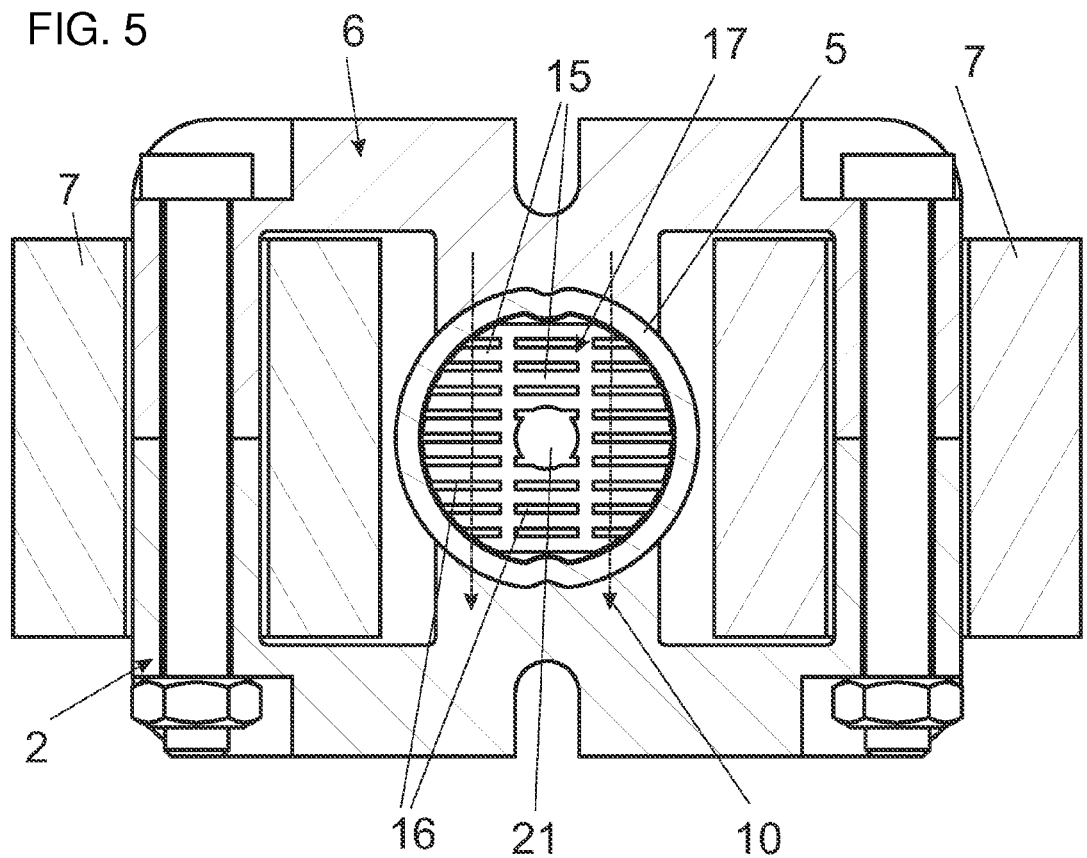
FIG. 5 shows a cross section through a second version of the apparatus.
Figure 6:
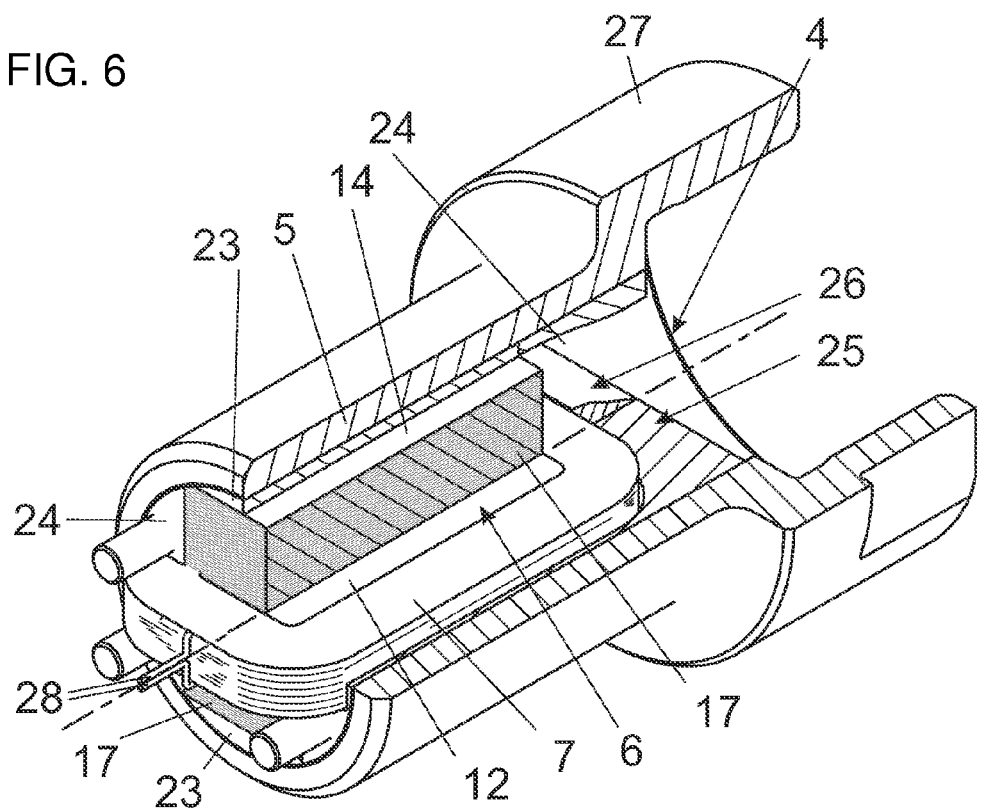
FIG. 6 shows a partly sectional oblique view of a third version.
Figure 7:
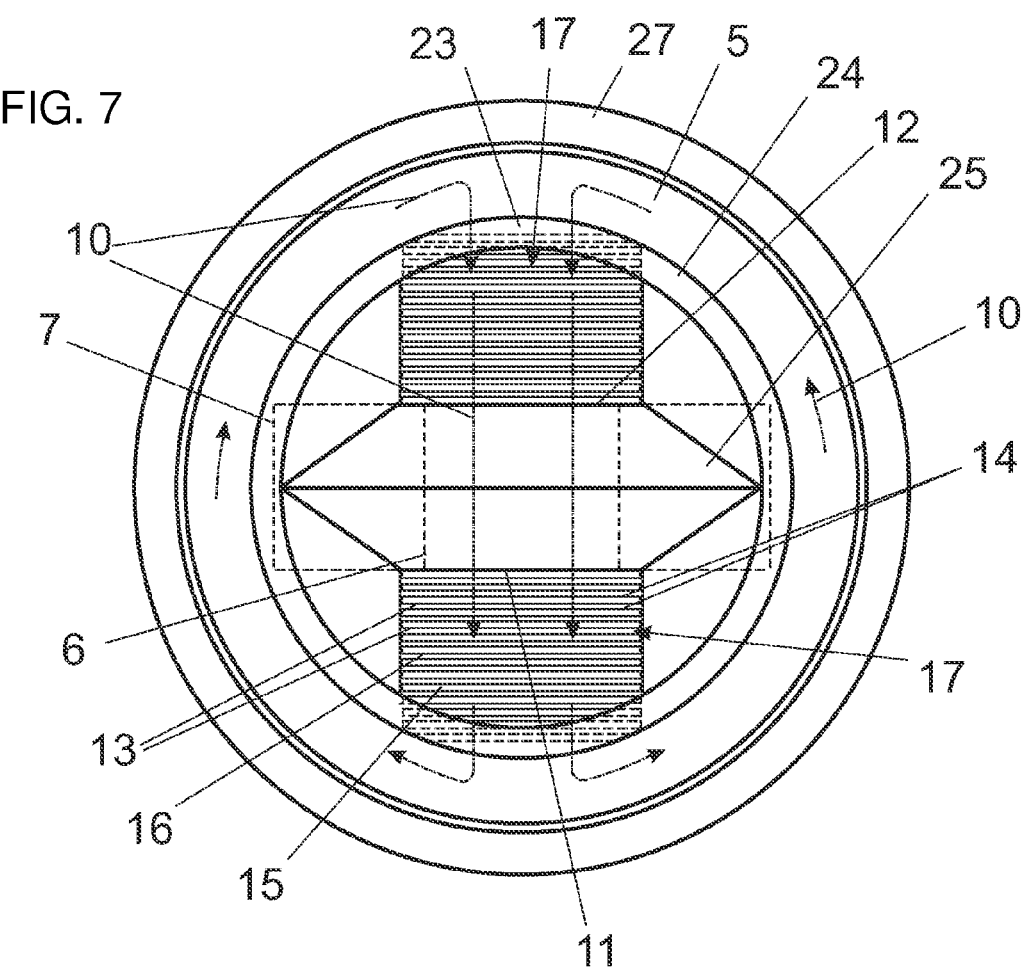
FIG. 7 shows a receptacle-side end view of the third version.

FIG. 5 shows a version in which the outlet duct has a cylindrical cross section in which is arranged a bundle 17 of partitions 15, the set-up of which may be in the way described in FIG. 3 and in FIG. 4 or in the way yet to be described with regard to FIGS. 6 to 8. The bundle 17 has a central cavity 21, through which can be led, for example, a piston rod or a cable which pulls on the pressure surface, for example a piston, pressing the magneto-rheological fluid 3 out of the receptacle 1, as is shown in the above-mentioned US 2008/0245629 A1 and WO 2007/068435. The flow zone 5 in the outlet duct is assigned a coil arrangement 2, the core 6 of which is composed of two approximately E-shaped elements and which is equipped with two coils 7. In this version, the outlet duct is manufactured, in particular, from material of low magnetic conductivity, in order to keep the magnetic flux away via the duct wall, so that, in this version, too, the magnetic flux lines 10 come as far as possible closely and perpendicularly through the flow routes 16.

FIGS. 6 to 10 show a further version in which the magnet coil arrangement is provided inside the flow zone 5. FIG. 6 shows an angularly sectional oblique view of the outlet duct which is illustrated as a cylindrical tubular piece with a threaded sleeve 27. The receptacle 1 is screwed into the threaded sleeve 27 and is likewise formed by a tubular piece of identical diameter. The contraction 4 at the start of the flow zone 5 is formed by a wedge-shaped middle web 25 of an insert 24, so that the magneto-rheological fluid 3 emerging from the receptacle 1 is subdivided into two part streams 26. The fluid 3 is contained in the receptacle 1 in a thin-walled closed capsule 31, as is shown, for example, in WO 2007/068016. The capsule 31 is manufactured, for example, from a film which is sealed after said capsule is filled with the fluid. In the event of an impact, the capsule 31 bursts and the fluid 3 passes through the flow zone 5 into the outlet duct. In the capsule 31, a separate bursting region 32 may be provided, in which bursting is facilitated in a special way, for example by means of a material weakening, so that the outflow of the fluid takes place in a defined way. Advantageously, the material weakening is designed such that, upon bursting, no splinters/shreds are formed which impair the flow. The coil arrangement 2 has a magnet coil 7, the axis of which lies perpendicularly to the flow zone 5 and is arranged centrally in the outlet duct such that it is covered (FIG. 8) by the wedge-shaped middle web 25. Arranged within the coil 7, in turn, is the core 6 which is parallelepipedal in this version and which adjoining it on both sides has a bundle 17 of partitions 15 with a multiplicity of flow routes 16, as is described in FIG. 4 or below with regard to FIGS. 9 and 10. A permanent magnet or a combination of permanent magnets and soft-magnetic materials may be used as a core. To close off each bundle 17, in each case an element 23 (pole cap) approximately in the form of a segment of a circle is put in place, which is manufactured from coil core material and bears against the inside of the cylindrical outlet duct. In this version, the outlet duct is likewise produced from a coil core material, for example from an iron tube or the like, in order to close the magnetic flux lines 10. Electrical junction lines 28 are led at the outlet-side end out of the outlet duct in a way not illustrated in any more detail. As shown in FIG. 8, this end is likewise provided with an external thread, onto which a collecting pot or the like can be screwed, although this is not absolutely necessary.

Figure 9:
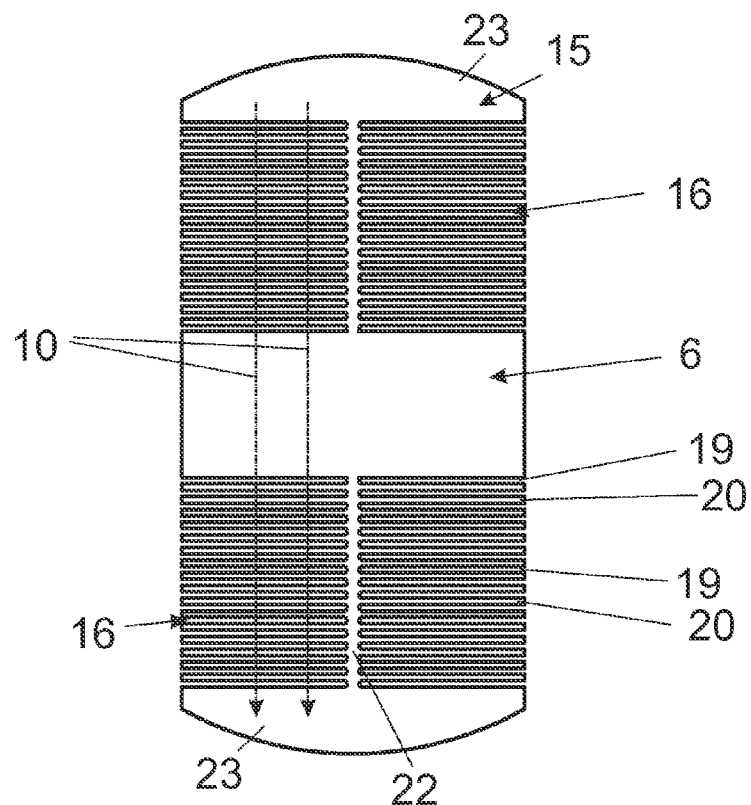
FIG. 9 shows a second version of a partition.
Figure 10:
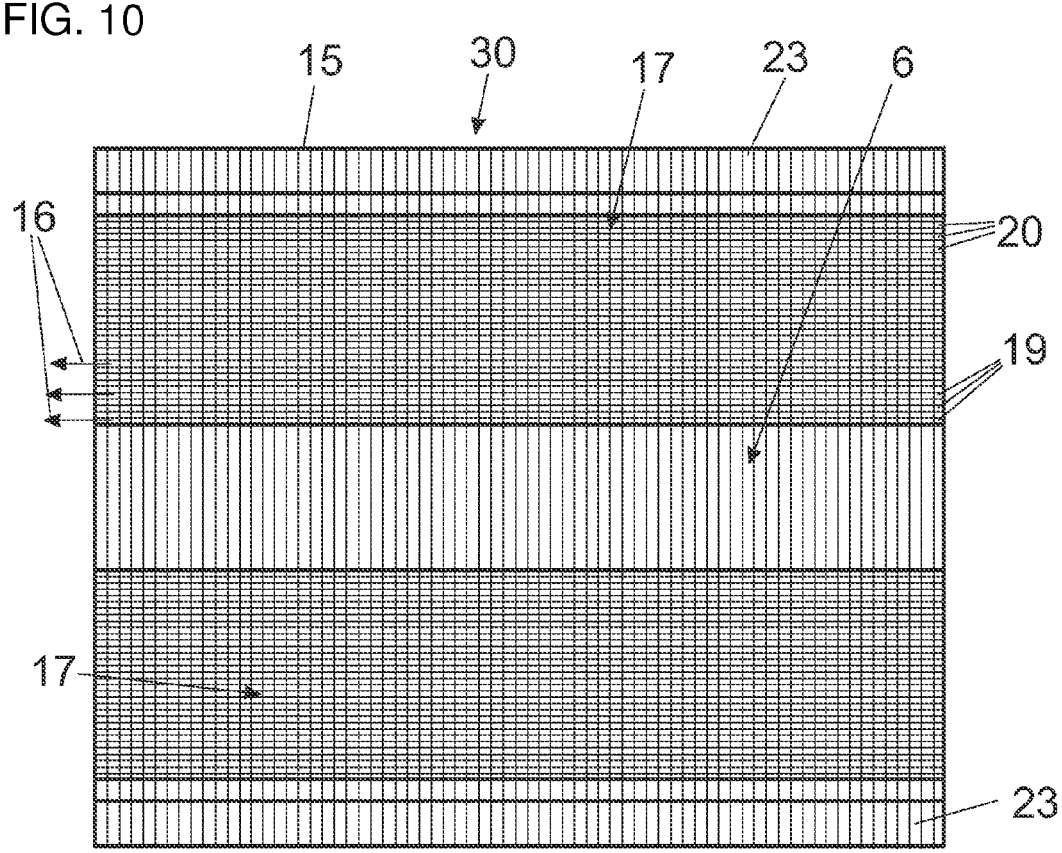
FIG. 10 shows an enlarged side view of a bundle of partitions of the second version.

As already mentioned with regard to FIG. 4, the bundle 17 may be composed of partitions 15 extending in the longitudinal direction of the flow zone 5. FIGS. 9 and 10 show a second possibility for configuring a bundle 17 of partitions 15 with flow routes 16. Each partition 15 in this case extends in a radial plane perpendicularly through the outlet duct, and the flow routes 16 are composed of slots 19 which are introduced into the partitions 15. A partition 15 of this type may, in particular, be stamped out of a transformer sheet or the like, a multiplicity of slots 19 being separated from one another by webs 20 which project from a middle connecting web 22 (FIG. 9). The slots 19 thereby extend as far as the edge and are covered by side parts of the insert 24. Connecting webs 22 could, of course, also be provided at both edges, and the slots 19 could extend between these without a middle interruption. As shown in FIG. 10, a plurality of partitions 15 are arranged directly one behind the other, the slots 19 being in alignment. The slot walls in this case constitute the additional pole faces 13, 14.

It is also conceivable to design the partition bundle as a folded element.

Manufacture by stamping out from transformer sheet or the like makes it possible, further, to produce the coil core 6, the two bundles 17 of partitions 15 and the closing-off element 23 in the form of a segment of a circle for adaptation to the cylindrical cross section of the outlet duct 5 in one piece which then has the form shown in FIG. 9. Those side faces of the partitions 15 which lie one against the other may be provided with an electrically insulating lacquer, so that eddy currents occurring in the individual partitions 15 are not added together. The part 30 shown in FIG. 10 is equipped with the coil 7 and is introduced into the insert 24 which is then introduced into the outlet duct and fixed axially, for example with the aid of the said collecting pot which can be screwed on at the outlet-side end. The insert 24 consists of a material having low magnetic conductivity, for example of a plastic.

Figure 11:
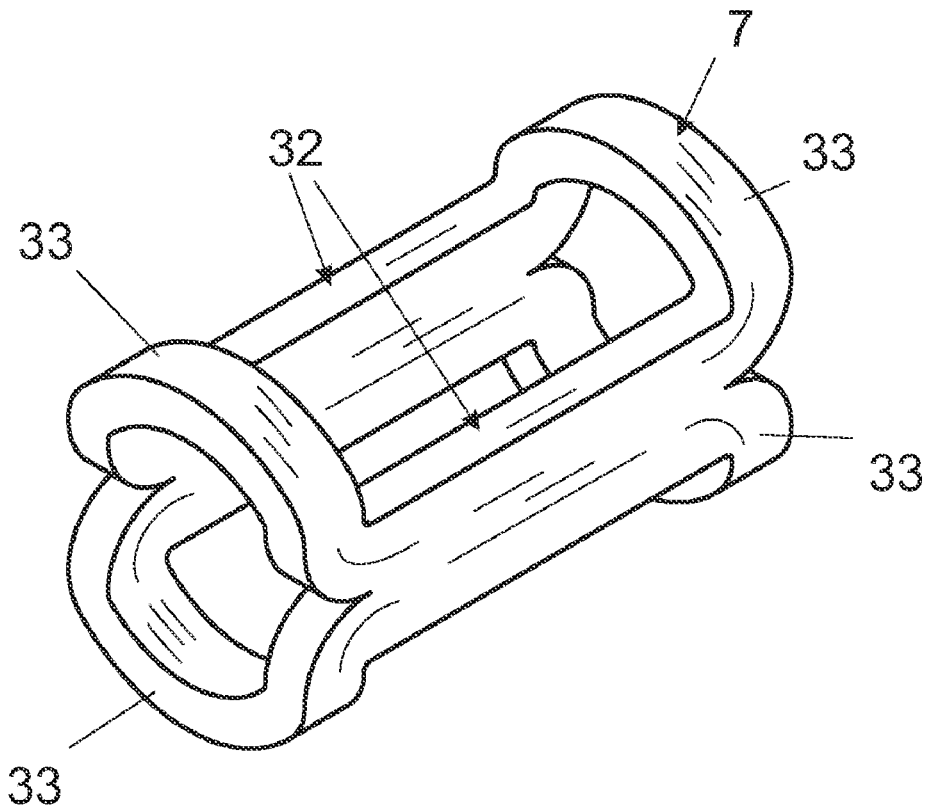
FIG. 11 shows a second version of a magnet coil in an oblique view.
Figure 12:
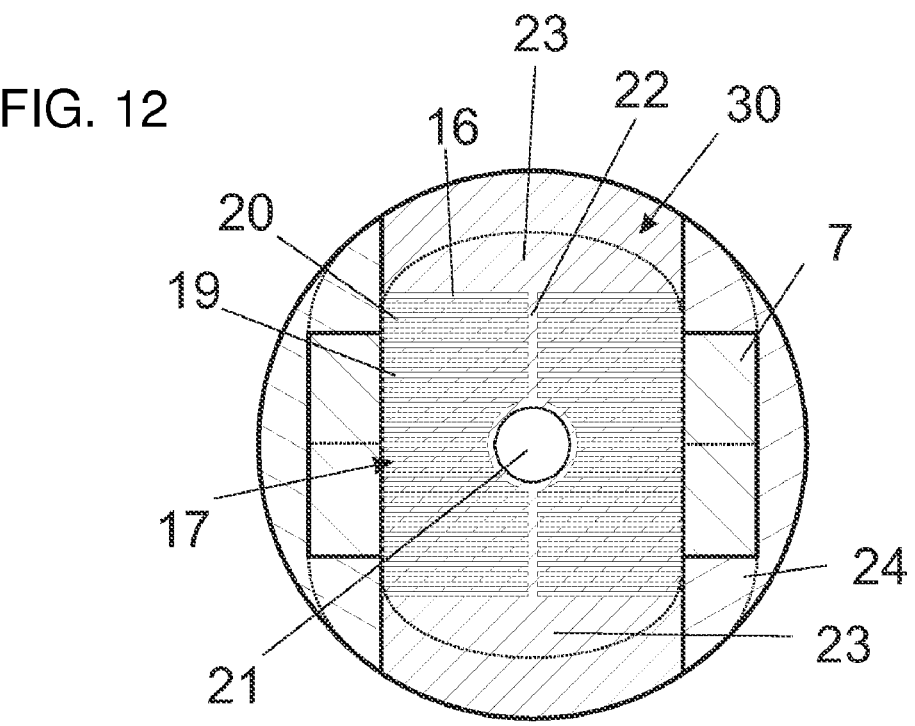
FIG. 12 shows a cross section through a further version of the apparatus with a magnet coil according to FIG. 11.

FIGS. 11 and 12 show a version in which the coil 7 is wound three-dimensionally, that is to say each winding does not lie in one plane, but is composed of a plurality of portions, in each case an approximately semicircular portion 33 being led upward or downward between the straight portions 32 extending in the outlet duct in the longitudinal direction of the flow zone 5. The coil 7 is thereby open at the ends, and a part 30 according to FIG. 12 may have a middle cavity 21 through which, for example, the abovementioned pull means can be led to the piston or the bottom of the receptacle 1. However, the cavity 21 may also serve for receiving a connecting element for the bundle 17 of partitions 15. Since the coil 7 is spread apart at the ends, the core 6 may also have within the coil 7 flow routes 16 which are formed between aligned webs 20 by slots 19.

Figure 13:
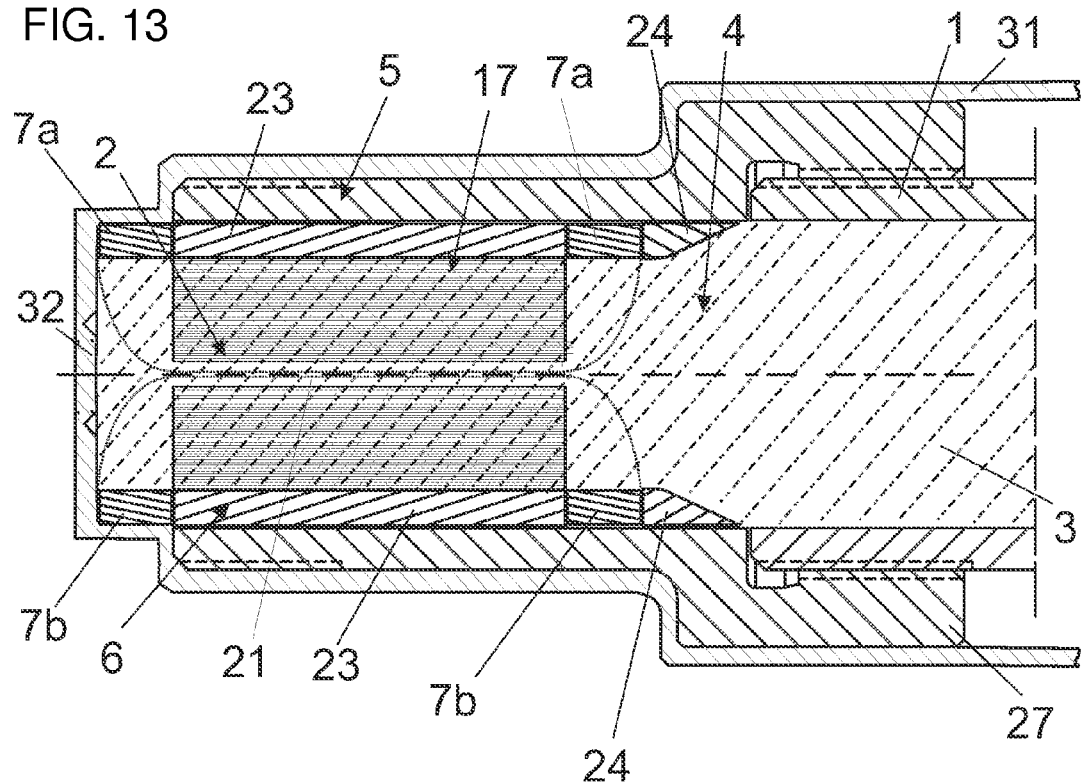
FIG. 13 shows a longitudinal section through a fifth version of the apparatus.

The form shown in FIG. 11 may also arise from two coils 7a, 7b, as shown in FIG. 13. In this version, each of the two coils 7a, 7b is assigned as a core the element 23 in the form of a segment of a circle, there being arranged between the two elements 23 a bundle 17 of partitions 15 which has flow routes 16 and a central cavity 21. The insert 24 is annular and is beveled toward the receptacle 1, at the same time forming the contraction 4. In this version, too, at least that portion of the outlet duct which contains the flow zone 5 is formed by a cylindrical tubular piece with a threaded sleeve 27 into which the receptacle 1 is screwed. In this version, the receptacle 1 and the outlet duct are arranged jointly within the capsule 31, its bursting region 32 which is formed by the material weakening being provided at the outlet-side end of the flow zone 5. The flow zone 5 is therefore constantly filled with a magneto-rheological fluid 3. The bursting region 32 is designed such that the capsule 31 bursts when a force overshooting a predefined value acts on the energy-absorbing apparatus.

Figure 14:
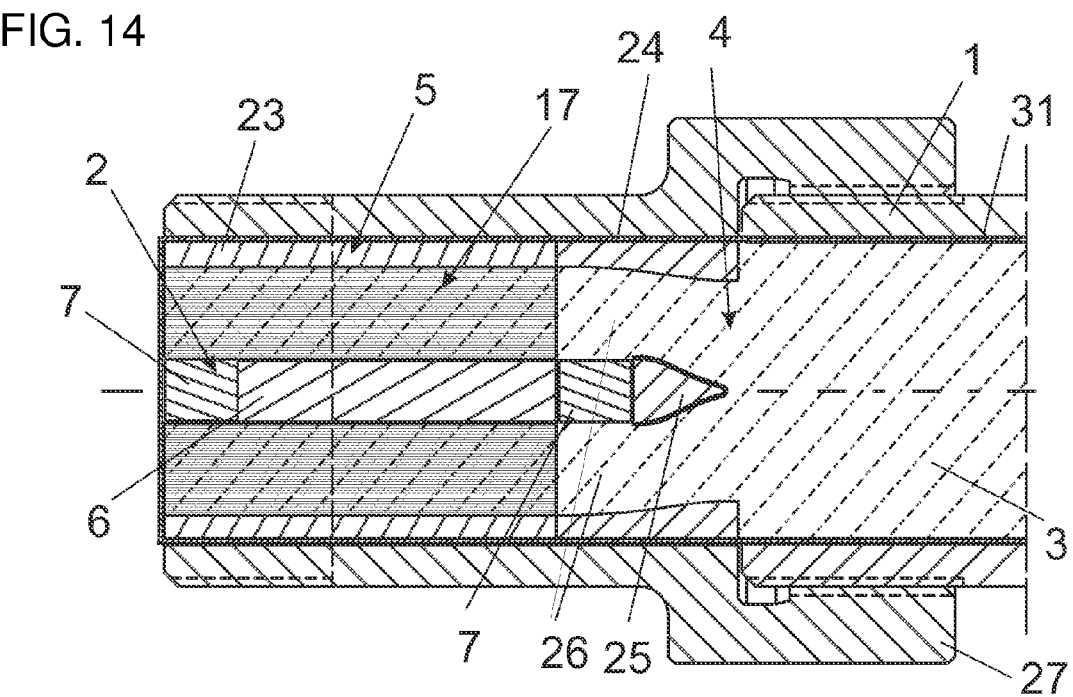
FIG. 14 shows a longitudinal section, similar to FIG. 8, through a sixth version.

A similar version is shown in FIG. 14. Here, once again, a similar central coil arrangement to that in FIGS. 6 to 8 is provided, but in the version according to FIG. 14, too, the flow zone 5 is provided in a capsule 31. The capsule 31 lines the outlet duct and the receptacle 1 and has a bursting region 32 at the outlet-side end of the flow zone 5, so that in this version, too, the flow zone 5 is filled constantly with the magneto-rheological fluid 3.

The device for generating the variable magnetic field, arranged in the magneto-rheological fluid 3 or in the flow zone 5, may also comprise a circuit board with a planar coil and with a core, in which case further electronic components for controlling the device 2 may also be arranged on the circuit board.

The coils 7 may not only be manufactured from an insulated copper wire, but also from a copper band, a copper foil or an anodized aluminum foil.

Figure 15:
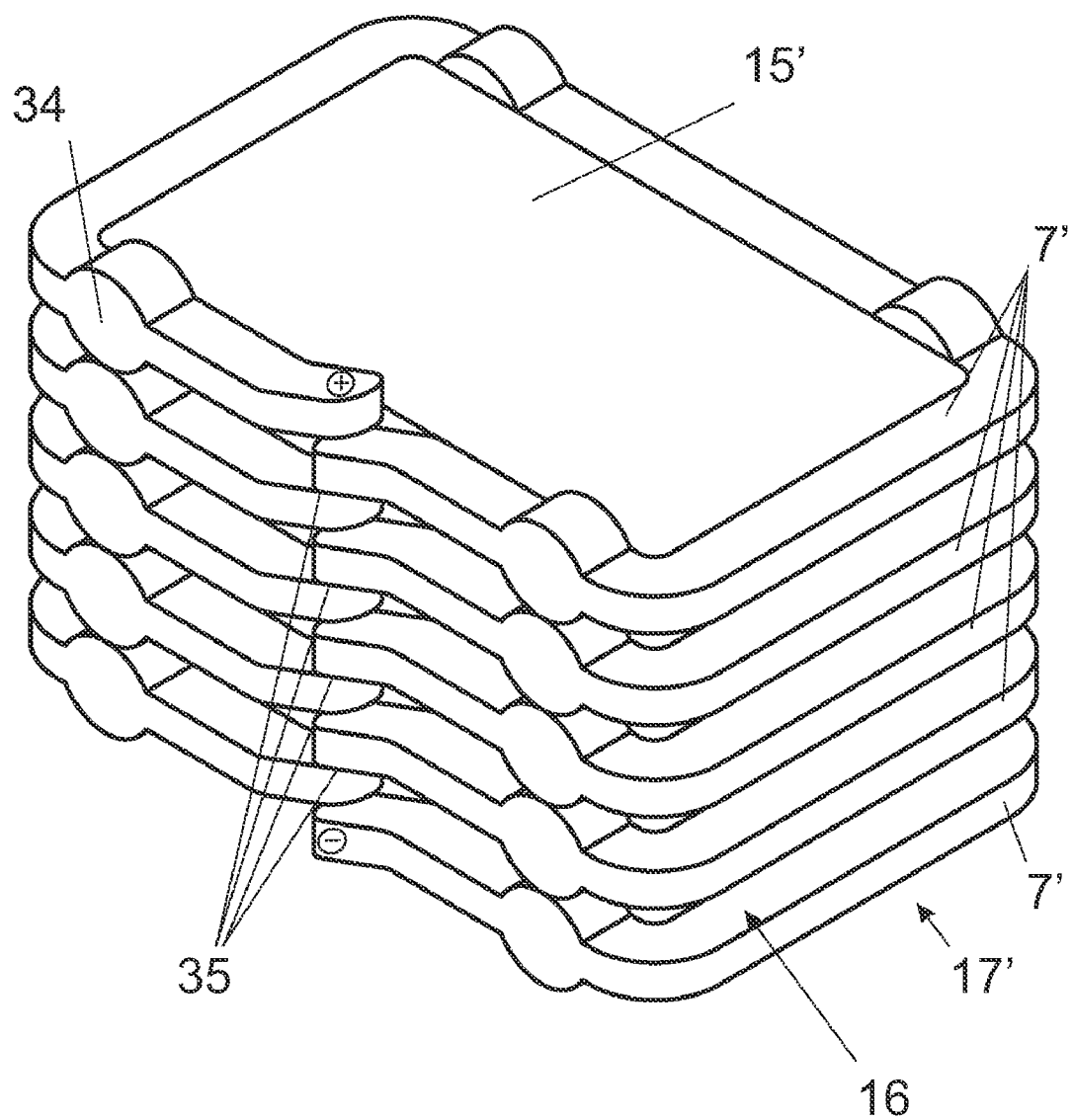
FIG. 15 shows a perspective view of a partition stack with individual partition coils.

FIG. 15 shows an exemplary embodiment of a partition stack in which the flow zone is subdivided into a plurality of flow routes 16 by partitions 15' arranged so as to be spaced apart from one another. One of these flow routes is depicted by way of example in FIG. 12 together with an indication of the flow direction.

In this exemplary embodiment, each partition 15' consisting of magnetically conductive or ferromagnetic material is assigned a specific partition coil 7' which in each case consists of only a single turn. This turn may be formed, for example, by an insulated conductor.

The individual partition coils are connected in series electrically, the output of the partition coil 7' in each case lying above being connected to the input of the partition coil 7' lying beneath. The contact points are designated by 35.

These partition coils 7' may be present alternatively or additionally to the coil 7 of the preceding figures. If they are present only alternatively to this coil, these partition coils linked together form this coil 7.

Preferably, the turn, at least on the inflow and the outflow side, is at most as high as the partition itself, with the result that the through flow is not impeded. The coil may be higher on the side faces. Here, the spacers 34 (for example, formed in the insulation of the partition coil 7') and the contacts 35 may also be arranged. The turn of the coil may also consist of an anodized aluminum foil. It is also possible to apply this turn to a circuit board. The circuit boards are then stacked as a multilayer.

The partitions 15' preferably consist of magnetically conductive ferromagnetic material and form the core of the individual partition coils.

If these individual partition coils are used, the coil in the preceding exemplary embodiments, which bears the reference numeral 7, may be dispensed with, as already mentioned. A benefit in terms of weight and of space is thereby achieved. However, in the case of particularly intense magnetic fields, both coils, to be precise the coil 7 and the partition coils 7', may be used.

The invention claimed is:

1. An energy-absorbing apparatus for occupant protection in vehicles, comprising:
    a receptacle having an outlet duct and containing a magneto-rheological fluid;
    a flow zone disposed to have the magneto-rheological fluid pressed therethrough in the event of an impact, said flow zone having an entrance formed with a contraction, said flow zone being formed in said outlet duct of said receptacle following said contraction;
    a device configured to generate a variable magnetic field, said device including pole faces assigned to said flow zone and configured to cause the magnetic field to act on the magneto-rheological fluid in order to regulate flow properties thereof; and
    at least one partition dividing said flow zone into at least two flow routes, said at least one partition forming two additional pole faces.

2. The apparatus according to claim 1, wherein said magneto-rheological fluid is enclosed in a capsule, and said capsule has a predetermined bursting region configured to bursts when a defined external force action is exceeded.

3. The apparatus according to claim 2, wherein said bursting region of said capsule is provided at one of two ends of said flow zone.

4. The apparatus according to claim 1, wherein at least two of said pole faces are planar pole faces.

5. The apparatus according to claim 1, wherein said partition is one of a plurality of partitions combined in at least one bundle with said partitions extending parallel to one another.

6. The apparatus according to claim 5, wherein said partitions extend parallel to the flow routes and are spaced apart from one another by spacer pieces.

7. The apparatus according to claim 6, wherein said spacer pieces are upstanding tabs.

8. The apparatus according to claim 5, wherein said partitions are stamped out of transformer sheet and are insulated relative to one another.

9. The apparatus according to claim 8, wherein said partitions are lacquered on faces touching one another.

10. The apparatus according to claim 8, wherein said flow zone is provided in a cylindrical outlet duct, and wherein planar outer pole faces are provided on circular arc-shaped elements, said planar outer pole faces having curved faces bearing against an inner wall of said outlet duct.

11. The apparatus according to claim 5, wherein said bundle is formed with a cavity continuous over a length thereof.

12. The apparatus according to claim 1, wherein said at least one partition extends in a cross-sectional plane of said flow zone and is formed with slots forming said flow routes, and wherein said slots have slot walls constituting said additional pole faces.

13. The apparatus according to claim 12, wherein said at least one partition is one of a plurality of partitions lined up closely to one another to form a bundle, with said slots being in alignment with one another.

14. The apparatus according to claim 1, wherein said device for generating the variable magnetic field includes a core wound with a coil and forming said at least one partition arranged in said flow zone, and wherein an axis of said coil is oriented perpendicularly to flow routes through said flow zone.

15. The apparatus according to claim 14, wherein said core within said coil is formed with additional flow routes, the winding of said coil leaving free inlet and outlet orifices of said flow routes.

16. The apparatus according to claim 1, wherein said flow zone is divided into flow routes by said at least one partition, and said partition is provided with a partition coil at an end face thereof.

17. The apparatus according to claim 1, wherein said flow zone is divided into flow routes by a plurality of spaced-apart partitions, and wherein each partition is assigned a specific partition coil that is led around said partitions at end faces thereof.

18. The apparatus according to claim 17, wherein each said partition coil has a single turn.

19. The apparatus according to claim 17, wherein said partition coil is formed by an insulated conductor.

20. The apparatus according to claim 17, wherein said partition coils of adjacent said partitions are electrically connected to one another.

21. The apparatus according to claim 20, wherein said partition coils of adjacent said partitions are connected in series.

22. The apparatus according to claim 1, wherein said device is configured such that, upon a maximum applied magnetic field, the apparatus blocks the passage of the magneto-rheological fluid through said flow routes.

23. The apparatus according to claim 22, configured to block the magneto-rheological fluid against pressures of up to 60 bar.

24. The apparatus according to claim 22, configured to block the magneto-rheological fluid against pressures of up to 200 bar.

25. In combination, a steering column and an energy-absorbing apparatus according to claim 1.

26. An energy-absorbing apparatus for occupant protection in vehicles, comprising:
- a receptacle containing a magneto-rheological fluid;
- a flow zone disposed to have the magneto-rheological fluid pressed therethrough in the event of an impact;
- a device configured to generate a variable magnetic field, said device including pole faces assigned to said flow zone and configured to cause the magnetic field to act on the magneto-rheological fluid in order to regulate flow properties thereof; and
- a plurality of partitions dividing said flow zone into a plurality of flow routes, said plurality of partitions combined in at least one bundle with said partitions extending parallel to one another and forming two additional pole faces, wherein said partitions are stamped out of transformer sheet and are insulated relative to one another.

27. The apparatus according to claim 26, wherein said partitions are lacquered on faces touching one another.

28. The apparatus according to claim 26, wherein said bundle is formed with a cavity continuous over a length thereof.

29. The apparatus according to claim 26, wherein said device is configured such that, upon a maximum applied magnetic field, the apparatus blocks the passage of the magneto-rheological fluid through said flow routes.

30. The apparatus according to claim 29, configured to block the magneto-rheological fluid against pressures of up to 60 bar.

31. The apparatus according to claim 29, configured to block the magneto-rheological fluid against pressures of up to 200 bar.

32. In combination, a steering column and an energy-absorbing apparatus according to claim 26.

33. An energy-absorbing apparatus for occupant protection in vehicles, comprising:
- a receptacle containing a magneto-rheological fluid;
- a flow zone disposed to have the magneto-rheological fluid pressed therethrough in the event of an impact;
- a device configured to generate a variable magnetic field, said device including pole faces assigned to said flow zone and configured to cause the magnetic field to act on the magneto-rheological fluid in order to regulate flow properties thereof; and
- at least one partition dividing said flow zone into at least two flow routes, said at least one partition forming two additional pole faces;
- wherein said device for generating the variable magnetic field includes a core wound with a coil and forming said at least one partition arranged in said flow zone, and wherein an axis of said coil is oriented perpendicularly to flow routes through said flow zone.

34. The apparatus according to claim 33, wherein said core within said coil is formed with additional flow routes, the winding of said coil leaving free inlet and outlet orifices of said flow routes.

35. The apparatus according to claim 33, wherein said device is configured such that, upon a maximum applied magnetic field, the apparatus blocks the passage of the magneto-rheological fluid through said flow routes.

36. The apparatus according to claim 35, configured to block the magneto-rheological fluid against pressures of up to 60 bar.

37. The apparatus according to claim 35, configured to block the magneto-rheological fluid against pressures of up to 200 bar.

38. In combination, a steering column and an energy-absorbing apparatus according to claim 33.

39. An energy-absorbing apparatus for occupant protection in vehicles, comprising:
- a receptacle containing a magneto-rheological fluid;
- a flow zone disposed to have the magneto-rheological fluid pressed therethrough in the event of an impact; said flow zone has an entrance formed with a contraction, a device configured to generate a variable magnetic field, said device including pole faces assigned to said flow zone and configured to cause the magnetic field to act on the magneto-rheological fluid in order to regulate flow properties thereof; and at least one partition dividing said flow zone into at least two flow routes, said at least one partition forming two additional pole faces, wherein said flow zone is provided in a cylindrical outlet duct, and wherein planar outer pole faces are provided on circular arc-shaped elements, said planar outer pole faces having curved faces bearing against an inner wall of said outlet duct.

40. The apparatus according to claim 39, wherein said device is configured such that, upon a maximum applied magnetic field, the apparatus blocks the passage of the magneto-rheological fluid through said flow routes.

41. The apparatus according to claim 40, configured to block the magneto-rheological fluid against pressures of up to 60 bar.

42. The apparatus according to claim 40, configured to block the magneto-rheological fluid against pressures of up to 200 bar.

43. In combination, a steering column and an energy-absorbing apparatus according to claim 39.

44. An energy-absorbing apparatus for occupant protection in vehicles, comprising:

a receptacle containing a magneto-rheological fluid;

a flow zone disposed to have the magneto-rheological fluid pressed therethrough in the event of an impact;

a device configured to generate a variable magnetic field, said device including pole faces assigned to said flow zone and configured to cause the magnetic field to act on the magneto-rheological fluid in order to regulate flow properties thereof; and at least one partition dividing said flow zone into at least two flow routes, said at least one partition forming two additional pole faces, wherein said flow zone is divided into flow routes by a plurality of spaced-apart partitions, and wherein each partition is assigned a specific partition coil that is led around said partitions at end faces thereof, wherein each said partition coil has a single turn.

45. The apparatus according to claim 44, wherein said partition coil is formed by an insulated conductor.

46. The apparatus according to claim 44, wherein said partition coils of adjacent said partitions are electrically connected to one another.

47. The apparatus according to claim 46, wherein said partition coils of adjacent said partitions are connected in series.

48. The apparatus according to claim 44, wherein said device is configured such that, upon a maximum applied magnetic field, the apparatus blocks the passage of the magneto-rheological fluid through said flow routes.

49. The apparatus according to claim 48, configured to block the magneto-rheological fluid against pressures of up to 60 bar.

50. The apparatus according to claim 48, configured to block the magneto-rheological fluid against pressures of up to 200 bar.

51. In combination, a steering column and an energy-absorbing apparatus according to claim 44.

* * * * *